US011622626B2

(12) United States Patent
Bradlee

(10) Patent No.: US 11,622,626 B2
(45) Date of Patent: Apr. 11, 2023

(54) LIFT FOR TELEVISION OR OTHER VISUAL DISPLAY SCREEN

(71) Applicant: Touchstone Home Products, Inc., Exton, PA (US)

(72) Inventor: Evan T. Bradlee, Downingtown, PA (US)

(73) Assignee: Touchstone Home Products, Inc., Exton, PA (US)

(*) Notice: Subject to any disclaimer, the term of this patent is extended or adjusted under 35 U.S.C. 154(b) by 390 days.

(21) Appl. No.: 16/889,222

(22) Filed: Jun. 1, 2020

(65) Prior Publication Data

US 2020/0375356 A1   Dec. 3, 2020

Related U.S. Application Data

(60) Provisional application No. 62/855,268, filed on May 31, 2019.

(51) Int. Cl.
*A47B 81/06* (2006.01)
*F16M 11/28* (2006.01)
(Continued)

(52) U.S. Cl.
CPC .......... *A47B 81/064* (2013.01); *F16M 11/10* (2013.01); *F16M 11/28* (2013.01); *H04N 5/655* (2013.01); *F16M 2200/021* (2013.01)

(58) Field of Classification Search
CPC ........ F16M 11/18; F16M 11/28; F16M 11/10; F16M 2200/024; A47B 81/064; H04N 5/655
See application file for complete search history.

(56) References Cited

U.S. PATENT DOCUMENTS

| 6,064,373 A | 5/2000 | Ditzik |
| 6,326,955 B1 | 12/2001 | Ditzik |

(Continued)

FOREIGN PATENT DOCUMENTS

| CN | 206491483 U | 9/2017 |
| KR | 20100012675 A | 2/2010 |

(Continued)

OTHER PUBLICATIONS

Int'l Search Report and Written Opinion dated Aug. 13, 2020 in Int'l Application No. PCT/US2020/035328.

(Continued)

*Primary Examiner* — Bradley Duckworth
(74) *Attorney, Agent, or Firm* — Panitch Schwarze Belisario & Nadel LLP

(57) ABSTRACT

Briefly stated, an example of a visual-display screen lift comprises a base and a lower support member attached to the base. An upper support member has an upper end portion and a lower portion telescopically engaged with the lower support member. A visual-display-screen support member is pivotably connected to the upper end portion of the upper support member for pivotably supporting a visual display screen thereon. The visual-display-screen support member has a home position aligning the visual-display-screen support member at a selected angular orientation with respect to the upper support member. A drive mechanism is operatively connected to the upper support member for raising and lowering the upper support member. A sensor is configured to detect an angular position of the visual-display-screen support member. The sensor is operatively connected to the drive mechanism such that operation of the drive mechanism depends upon the angular position of the visual-display-screen support member.

20 Claims, 11 Drawing Sheets

(51) Int. Cl.
*H04N 5/655* (2006.01)
*F16M 11/10* (2006.01)

(56) References Cited

U.S. PATENT DOCUMENTS

| | | | |
|---|---|---|---|
| 6,352,226 B1 * | 3/2002 | Gordon | F16M 11/18 |
| | | | 248/917 |
| 7,091,961 B2 | 8/2006 | Ditzik | |
| D586,151 S | 2/2009 | Roberts | |
| D586,584 S | 2/2009 | Hung | |
| 7,677,517 B2 | 3/2010 | Suzuki | |
| 7,679,888 B2 | 3/2010 | Kirschner et al. | |
| 7,854,415 B2 | 12/2010 | Holbrook et al. | |
| 7,864,512 B2 | 1/2011 | Kirschner et al. | |
| 8,079,651 B2 * | 12/2011 | Cvek | F16M 11/2092 |
| | | | 312/196 |
| 8,139,171 B2 * | 3/2012 | Osada | H04N 5/64 |
| | | | 348/841 |
| 8,286,927 B2 | 10/2012 | Sweere et al. | |
| 8,678,523 B2 | 3/2014 | Carr | |
| 8,925,154 B2 | 1/2015 | Ergun | |
| 8,991,951 B2 | 3/2015 | Lee et al. | |
| D742,863 S | 11/2015 | Aoyagi et al. | |
| 9,267,639 B2 | 2/2016 | Sweere et al. | |
| 9,360,152 B2 | 6/2016 | Sweere et al. | |
| 9,687,073 B2 | 6/2017 | Sweere et al. | |
| 10,178,209 B1 | 1/2019 | Hesse | |
| 10,267,451 B2 | 4/2019 | Sweere et al. | |
| D862,936 S | 10/2019 | Laudadio et al. | |
| 10,485,335 B1 | 11/2019 | Johnson et al. | |
| 10,492,607 B2 | 12/2019 | Choi et al. | |
| 10,520,129 B2 | 12/2019 | Sotgiu | |
| 10,550,996 B1 | 2/2020 | Chen et al. | |
| 10,698,193 B2 | 6/2020 | Jakober et al. | |
| 2003/0080949 A1 | 5/2003 | Ditzik | |
| 2006/0075550 A1 | 4/2006 | Tonar et al. | |
| 2006/0185563 A1 | 8/2006 | Sweere et al. | |
| 2006/0187626 A1 | 8/2006 | Ditzik | |
| 2007/0240347 A1 | 10/2007 | Chang | |
| 2007/0252919 A1 | 11/2007 | McGreevy | |
| 2009/0218174 A1 | 9/2009 | Gardner | |
| 2010/0061041 A1 | 3/2010 | Chen | |
| 2010/0061586 A1 | 3/2010 | Jain | |
| 2010/0176254 A1 | 7/2010 | Sweere et al. | |
| 2011/0001032 A1 | 1/2011 | Gardner | |
| 2011/0090410 A1 | 4/2011 | Ye | |
| 2013/0257236 A1 | 10/2013 | Head | |
| 2018/0209579 A1 * | 7/2018 | Bowman | F16M 11/18 |
| 2019/0357675 A1 | 11/2019 | Choi et al. | |
| 2020/0072410 A1 | 3/2020 | Ren et al. | |

FOREIGN PATENT DOCUMENTS

| | | |
|---|---|---|
| WO | 2006036889 A2 | 4/2006 |
| WO | 2007013827 A1 | 2/2007 |

OTHER PUBLICATIONS

Int'l Preliminary Report on Patentability dated Dec. 9, 2021 in Int'l Application No. PCT/US2020/035328.

* cited by examiner

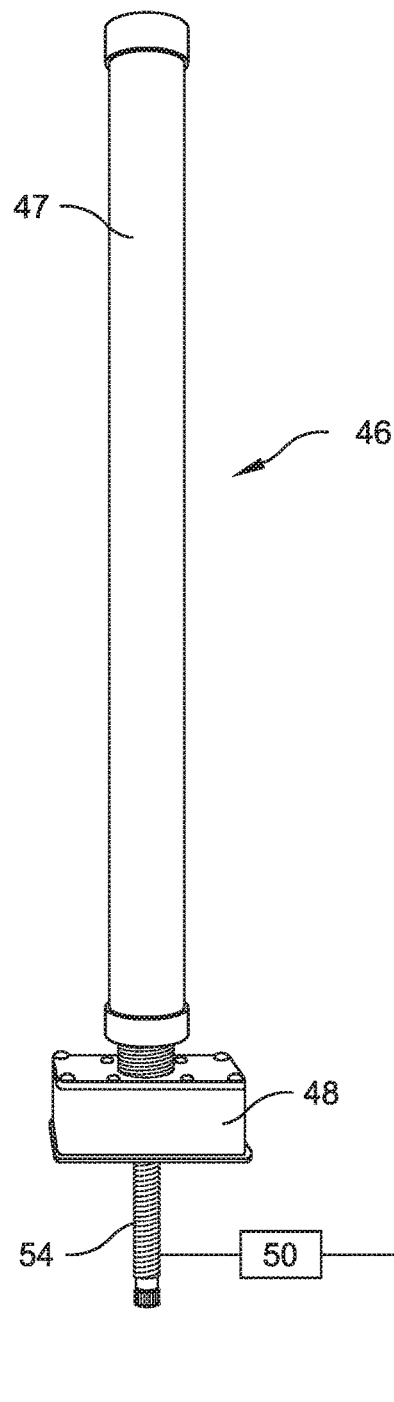
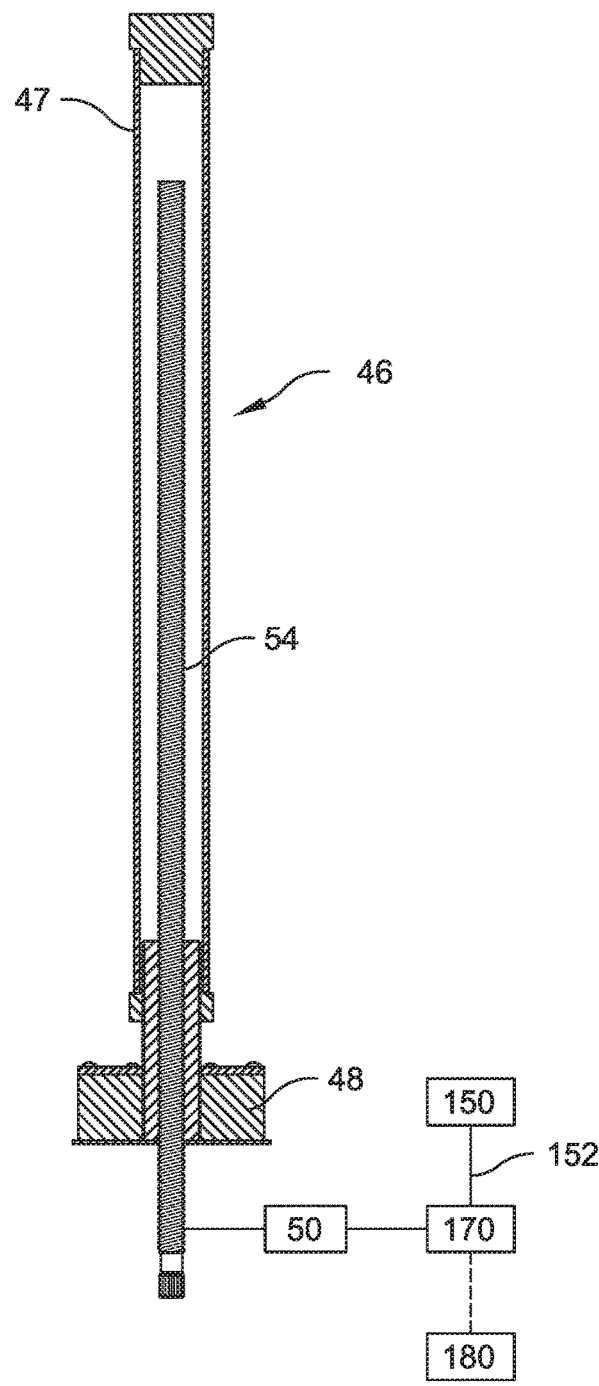
*Fig. 3*   *Fig. 4*

LIFT FOR TELEVISION OR OTHER VISUAL DISPLAY SCREEN

CROSS-REFERENCE TO RELATED APPLICATIONS

This application claims the benefit of priority under 35 USC § 119(e) of U.S. Provisional Patent Application No. 62/855,268 filed May 31, 2019, the contents of which are incorporated herein by reference.

BACKGROUND OF THE DISCLOSURE

The present disclosure relates generally to a pivotable visual-display-screen lift having a powered lift mechanism, and more particularly to a powered visual-display-screen lift having features requiring the visual-display-screen lift to be in a pre-determined home orientation before movement of the powered lift mechanism may occur.

SUMMARY OF THE DISCLOSURE

Briefly stated, an example of a visual-display screen lift comprises a base and a lower support member attached to the base. An upper support member has an upper end portion and a lower portion telescopically engaged with the lower support member. A visual-display-screen support member is pivotably connected to the upper end portion of the upper support member for pivotably supporting a visual display screen thereon. The visual-display-screen support member has a home position aligning the visual-display-screen support member at a selected angular orientation with respect to the upper support member. A drive mechanism is operatively connected to the upper support member for raising and lowering the upper support member. A sensor is configured to detect an angular position of the visual-display-screen support member. The sensor is operatively connected to the drive mechanism such that operation of the drive mechanism depends upon the angular position of the visual-display-screen support member.

BRIEF DESCRIPTION OF THE DRAWINGS

The foregoing summary, as well as the following detailed description of examples of systems and devices according to the invention, will be better understood when read in conjunction with the appended drawings. For the purpose of illustrating the invention, there are shown in the drawings embodiments presently preferred. It should be understood, however, that the invention is not limited to the precise arrangements and instrumentalities shown. In the drawings:

FIGS. 3 and 4 are front elevational and sectional partially schematic views of a drive mechanism, motor, and controller according to the present disclosure;

DETAILED DESCRIPTION OF THE INVENTION

Figure 1:
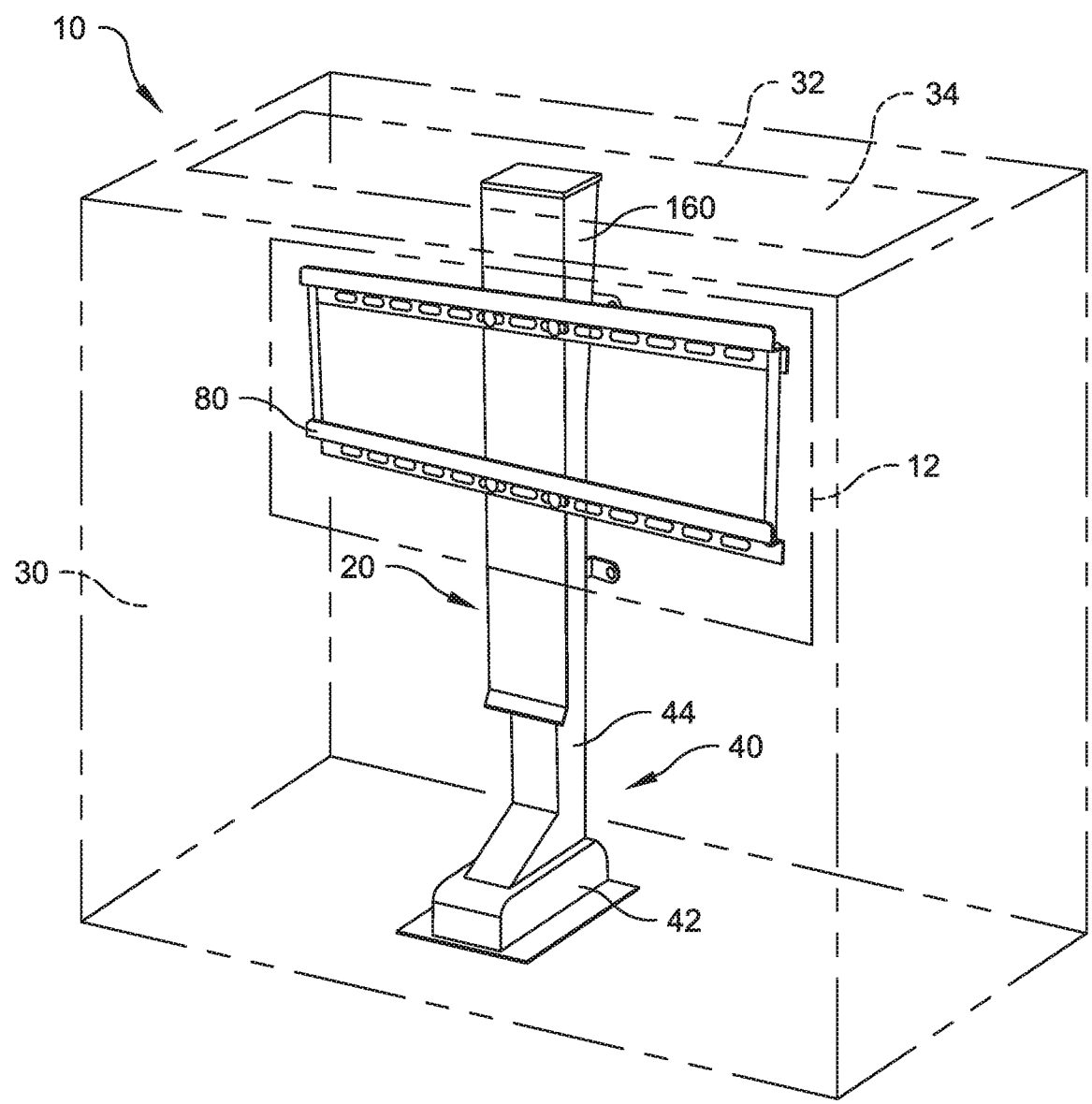
FIG. 1 is a right front perspective view of a visual-display-screen lift, with an enclosing cabinet, according to the present disclosure.
Figure 2:
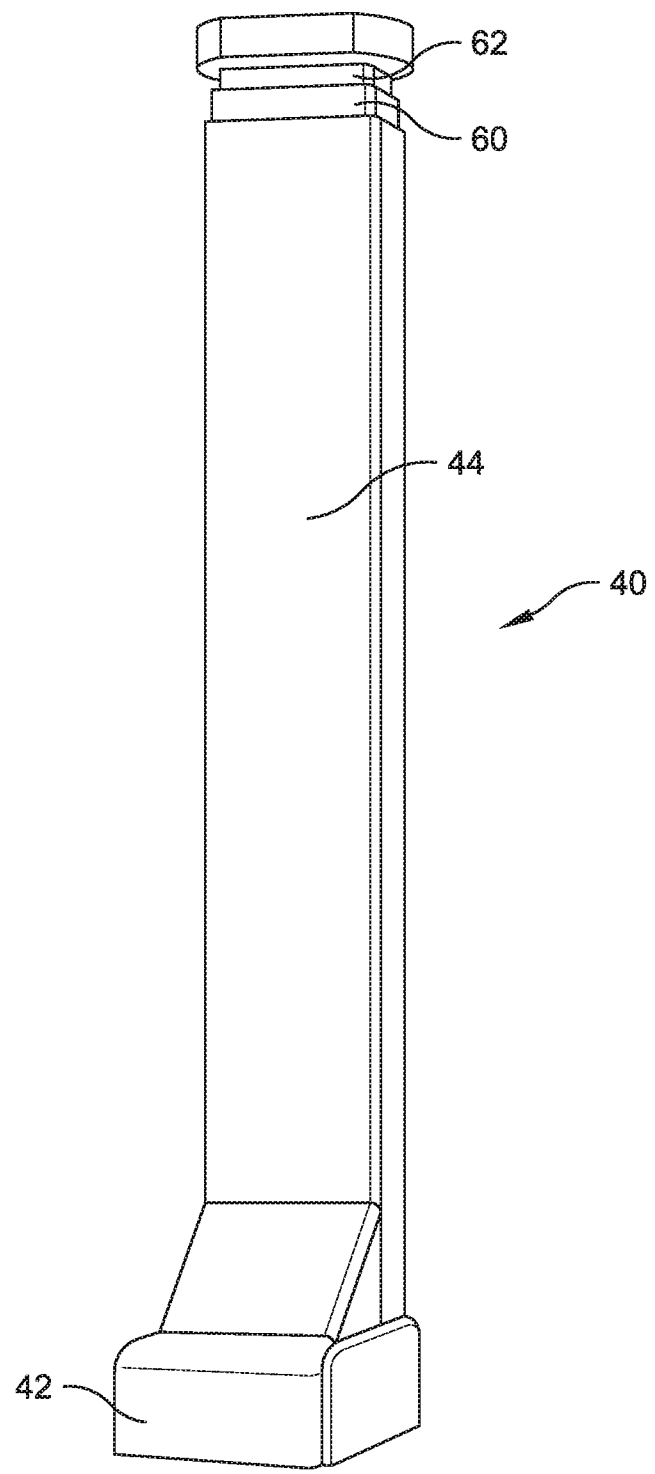
FIG. 2 is a front right perspective view of a pedestal for use with the visual-display-screen lift of FIG. 1.
Figure 5:
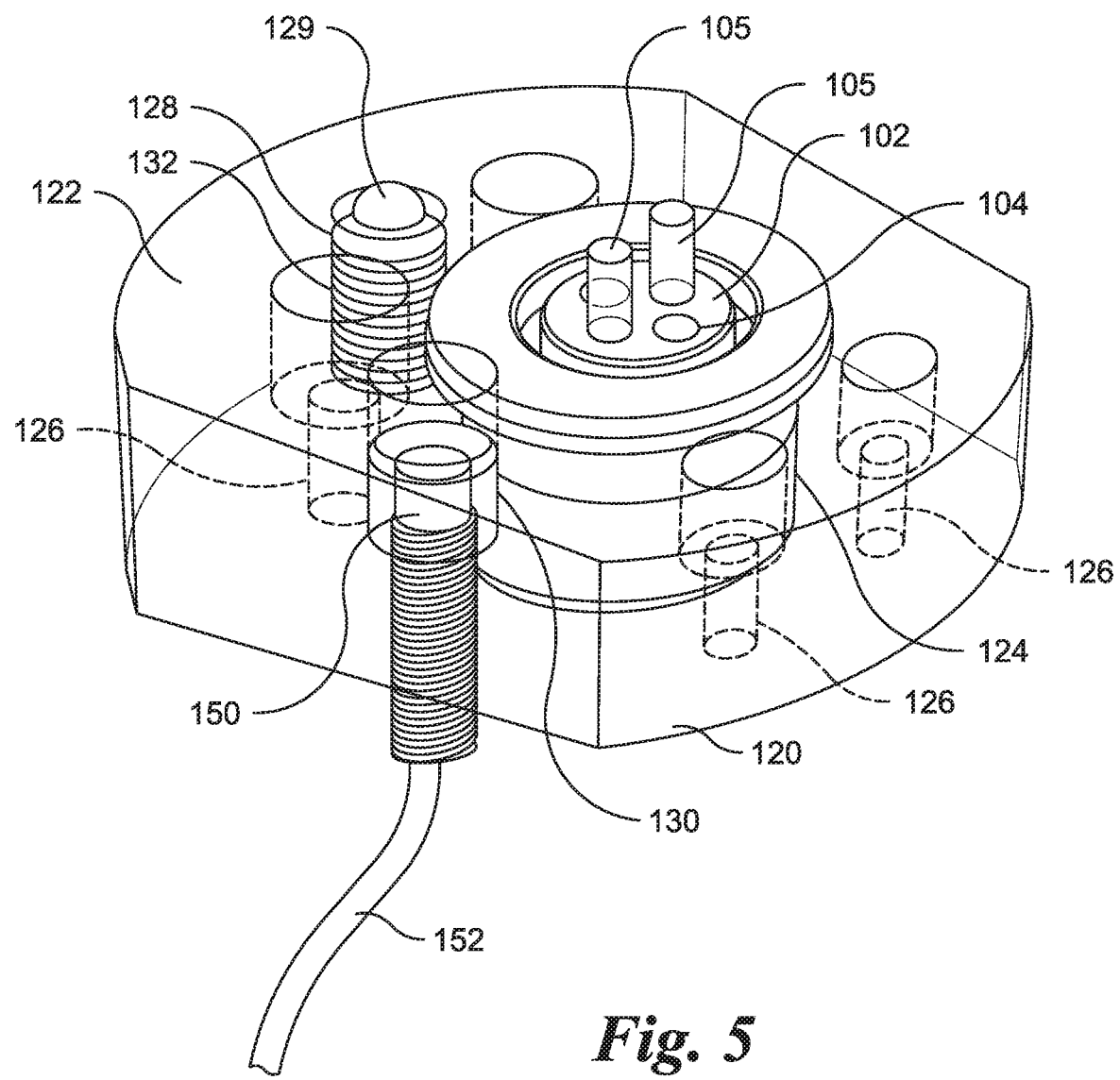
FIG. 5 is an enlarged front right upper partial perspective view of a portion of the visual-display-screen lift according to the present disclosure.
Figure 6:
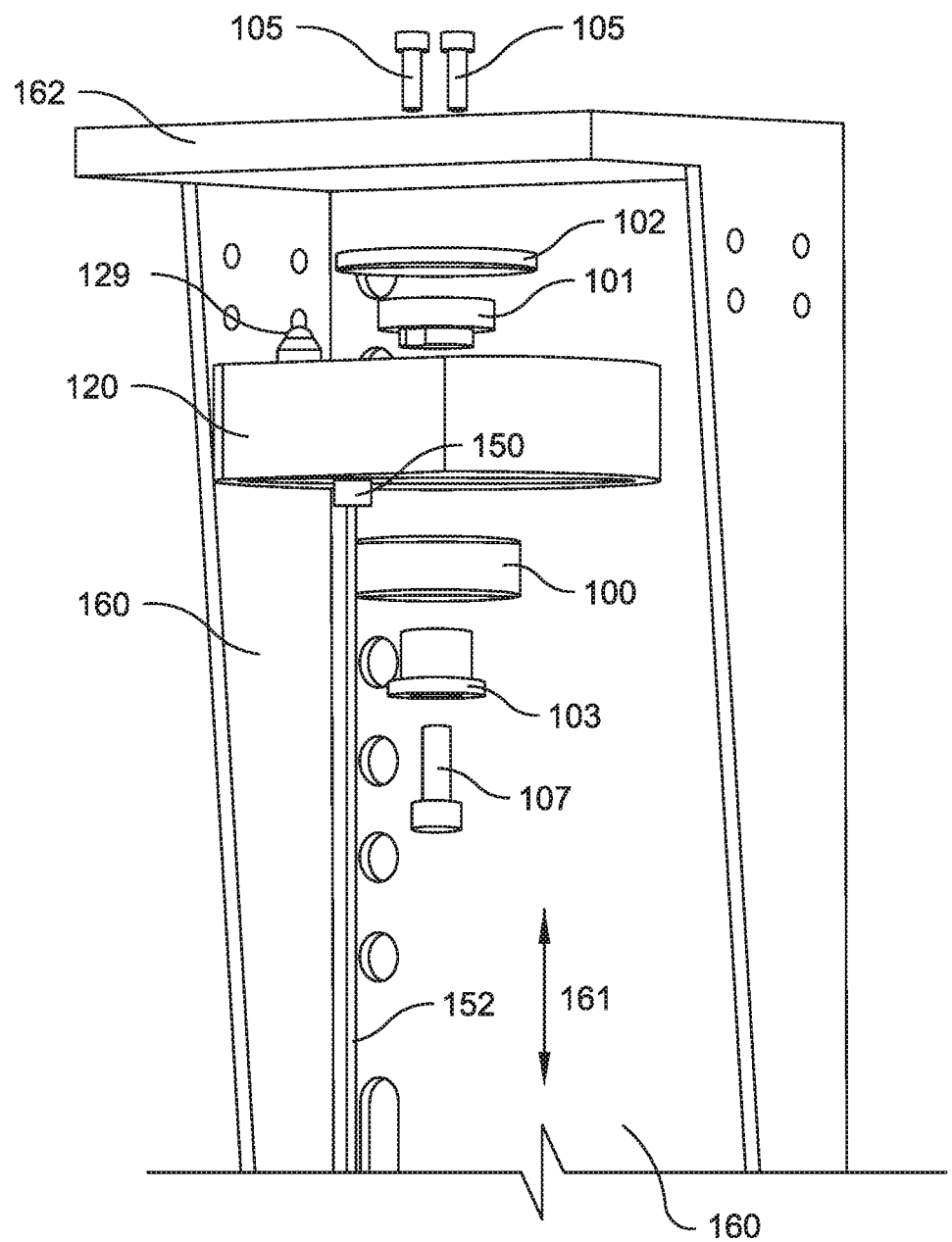
FIG. 6 is a front right exploded partial perspective view of a portion of the visual-display-screen lift according to the present disclosure.
Figure 7:
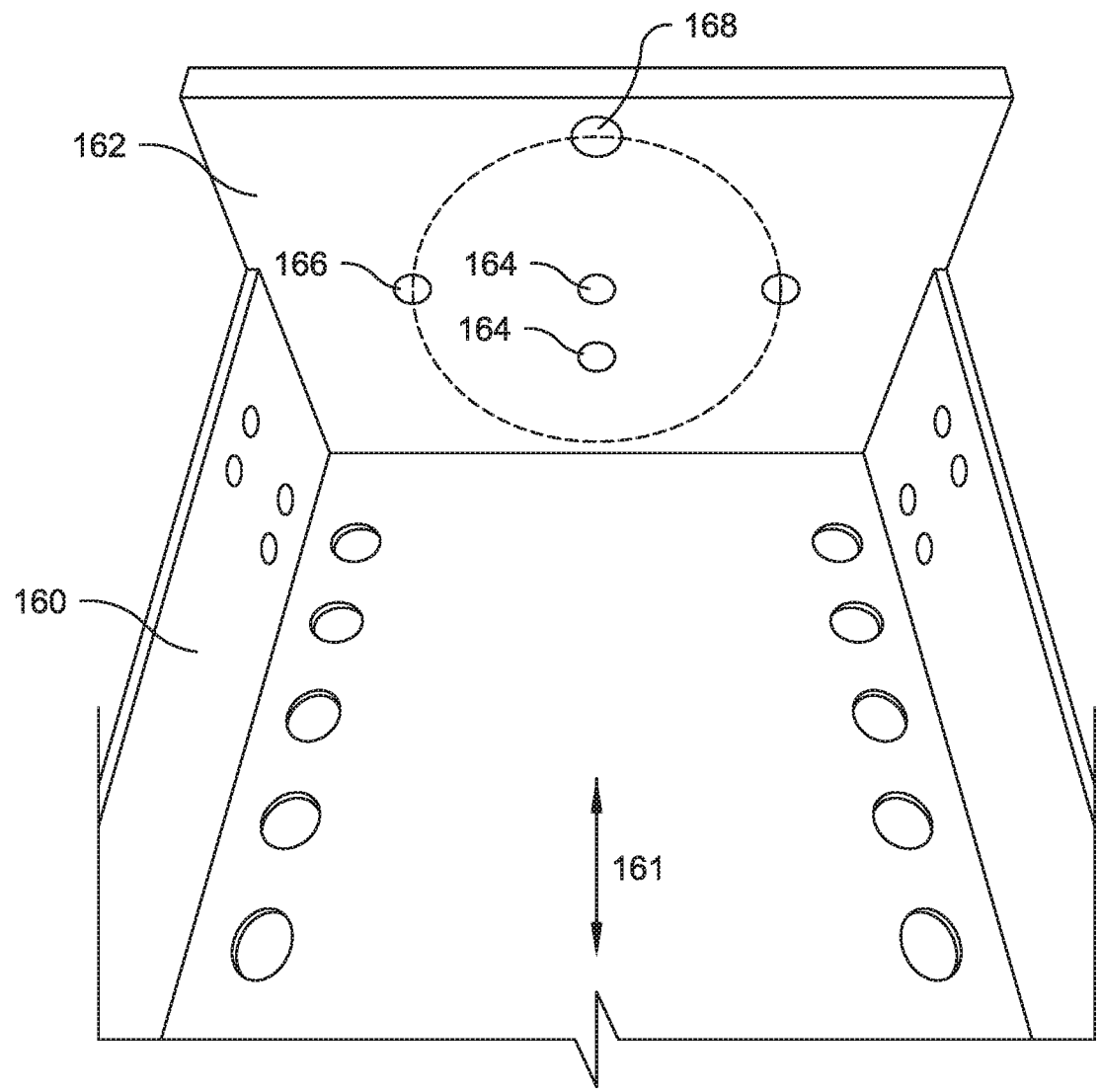
FIG. 7 is an internal partial perspective view of an upper L member according to the present disclosure.
Figure 8:
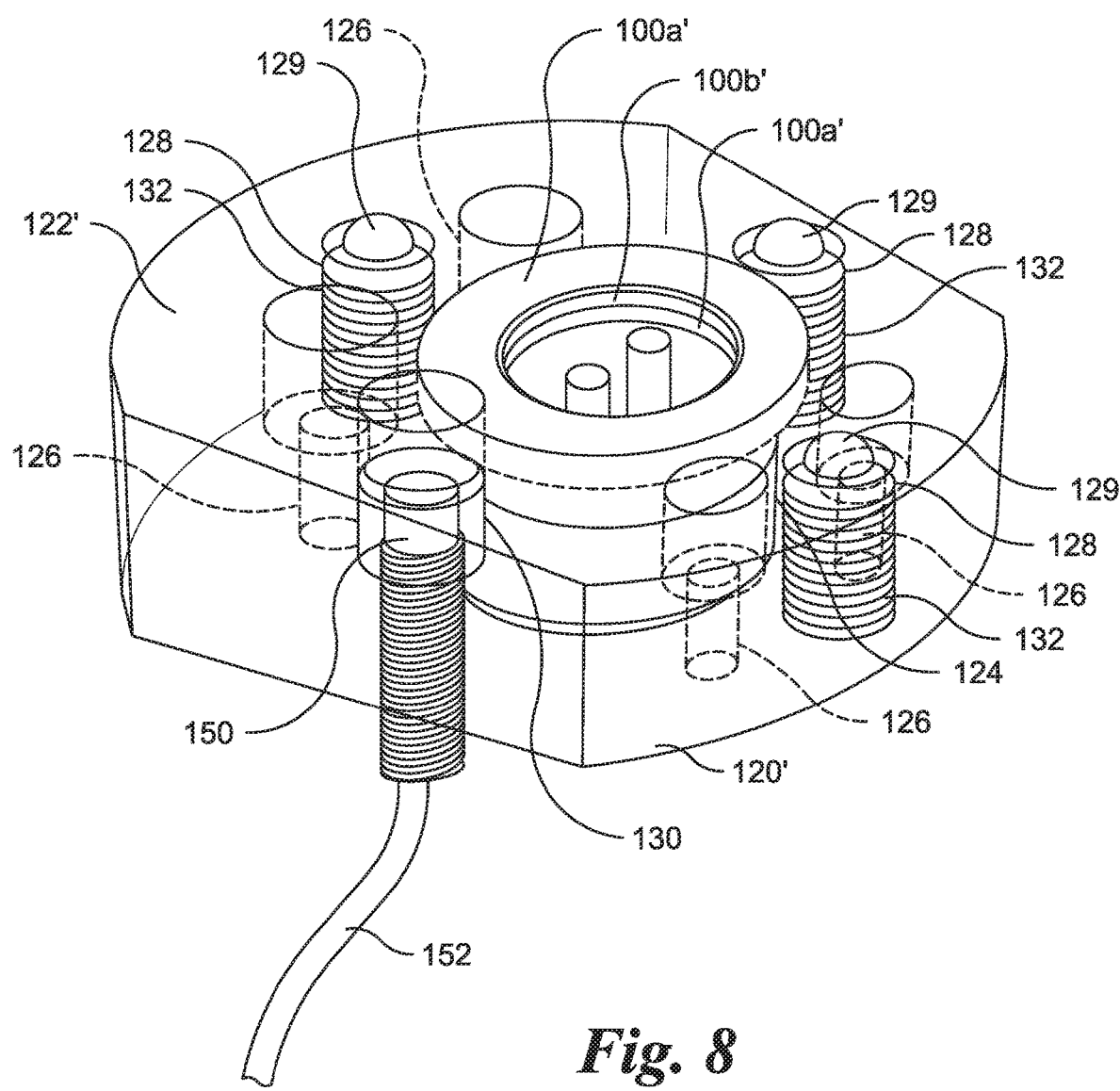
FIG. 8 is an enlarged front right upper partial perspective view of a portion of a second embodiment of a visual-display-screen lift according to the present disclosure.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of the device and designated parts thereof. Unless specifically set forth herein, the terms "a," "an," and "the" are not limited to one element but instead should be read as meaning "at least one." "At least one" may occasionally be used for clarity or readability, but such use does not change the interpretation of "a," "an," and "the." The terminology includes the words noted above, derivatives thereof and words of similar import. Moreover, the singular includes the plural, and vice versa, unless the context clearly indicates otherwise.

Referring to FIG. 1, a visual-display-screen lift 20 may be used as a stand-alone device or as part of a visual-display-screen lift system 10. The visual-display-screen lift 20 may include or be placed within a cabinet 30 (shown in phantom in FIG. 1) as a portion of the visual-display-screen lift system 10. The cabinet 30 may be used to conceal the visual-display-screen lift 20 and a visual display screen 12, such as a television or other video display, carried thereon, when the visual display screen 12 is not in use. The cabinet 30 may have an interior containing the base 42, the lower support member comprising the first tubular body 44, and a portion of an upper support member comprising a second tubular body 60 when the upper support member is in a lowered position, the cabinet 30 having an opening 32 for passing therethrough the portion of the second tubular body 60 of the upper support member and the visual display screen 12 carried thereby when the upper support member is in a raised position. The home position may be aligned with the opening 32 of the cabinet 30 so that the second tubular body 60 of the upper support member and the visual display screen 12 carried thereby move from the raised position to the lowered position without the upper support member or the visual display screen 12 carried thereby colliding with the cabinet 30.

An example of the cabinet 30 for use in such a system may include an opening 32, and the visual-display-screen lift 20 (and the visual display screen 12 carried by the lift 20) may extend through the opening 32 in a raised position (not shown). The cabinet 30 may include a door 34 for closing off the opening 32 when the visual-display-screen lift 20 is in a lowered position. The visual-display-screen lift 20 may include a lift mechanism comprising a lower portion 40 including a base 42 and a generally tubular lower support member comprising a first tubular body 44 attached to and typically extending upwardly from the base 42. The first tubular body 44 of the lower support member may have a non-circular cross section, for example a rectangular cross section, as shown in the illustrated embodiment. The base 42 may be adapted to be supported by any known type of support capable of supporting a sufficient load, such as a floor, a support surface within the cabinet 30, or a rolling platform or cart (not shown).

Referring to FIGS. 1 through 7, as noted above, the upper support member may have a second tubular body 60 with a non-circular cross section such as a rectangular cross section and an upper end portion 62. A lower portion may comprise a third tubular body 64 of the lower portion. The lower portion may be opposite the upper end portion 62 and may telescopically engage the lower portion 40 and in particular the first tubular body 44. The second tubular body 60, or another portion of the upper support member, may carry a visual-display-screen support member pivotably connected to the upper end portion 62 or another suitable portion thereof. The upper end portion 62 or another suitable portion thereof may be operatively connected to a pivotably supported visual-display-screen support member such as an upper L member 160. The upper L member 160 may have a longitudinal axis 161 and a cross section transverse to the longitudinal axis 161, and the cross section may be generally U-shaped. The upper L member 160 may have an upper end with an upper cap 162. The L member 160 or other visual-display-screen support member may have sufficient clearance from the upper support member, including the second tubular body 60 thereof, and/or a shape compatible with the shape of the upper support member so that the L member 160 may be pivoted a selected amount about the second tubular body 60 or the upper support member to allow a user to turn the L member 160 and the visual display screen 12 carried thereby in a desired direction for viewing after being raised to the extended position. The visual-display-screen support member—in the illustrated embodiment, the upper L member 160—may in turn carry a transverse support member, as in the depicted embodiment, a generally horizontally oriented rectangular frame 80 configured for mounting a television or other visual display screen 12 (FIG. 1) and fixed to the visual-display-screen support member. A drive mechanism 46 may be disposed at least partially within the lower support member and the first tubular body 44 and at least partially within the upper support member and the second tubular body 60. The drive mechanism 46 may be operatively connected to the upper support member for raising and lowering the second tubular body 60, the upper L member 160 or other visual-display-screen support member, the frame 80 or other transverse support member, and the visual display screen 12, as further described below.

As shown in FIGS. 3 and 4, the drive mechanism 46 may include a drive motor in the form of a motor 50 configured to drive a threaded rod 54, for example, by being configured to create a rotational motion and by including an output gear (not shown). The drive mechanism may alternatively include linear motors, hydraulic lifts, or other known mechanisms capable of raising and lowering the upper support member or the second tubular body 60 and the visual display screen 12 to the raised and lowered positions (and positions therebetween). The threaded rod 54 may be axially fixed with respect to the base 42 within the lower support member or more particularly the first tubular body 44 by, for example, a screw. A drive mechanism pipe 47 may be fixed to a drive block 48. The drive block 48 may be secured within the lower support member or more particularly the first tubular body 44 to be rotationally fixed but axially movable with respect to the lower support member. In the depicted embodiment, the drive block 48 is secured within the lower support member fixed rotationally with respect to the lower support member by the first tubular body 44 having a non-circular (in this case rectangular) cross section that is not rotatable with respect to an internal shape of the first tubular body 44; other mechanisms, including tracks, tabs, or other interlocking features, may be used. The drive block 48 and/or the drive mechanism pipe 47 may threadedly engage the threaded rod 54 so that rotation of the threaded rod 54 causes the drive-mechanism pipe 47 to translate vertically. The drive-mechanism pipe 47 is secured to the upper end portion 62 of the second tubular body 60, supported by and translating with the drive-mechanism pipe 47.

Referring to FIGS. 3 through 7, the upper support member, and in particular the second tubular body 60, may comprise or be attached to a swivel connector in the form of an upper platform 120 secured upon the upper end portion 62 of the second tubular body 60. A roller bearing 100 may be mounted in the upper platform 120. The L member 160 or other visual-display-screen support member may be rotatably supported with respect to the upper platform 120 by a bearing such as the roller bearing 100 operatively connected to the upper platform 120. The upper platform 120 may have an upper surface 122 and a bearing hole 124 accommodating the roller bearing 100. The upper platform 120 also may have mounting holes 126 for securing the platform 120 to the second tubular body 60. The upper platform 120 may include the detent (an operative portion thereof); the detent may include a ball-detent mount 128. The ball-detent mount 128 may be a depression holding a detent ball 129 disposed within the upper platform 120. The detent ball 120 may be biased upwardly by a spring disposed within the upper platform 120 to drive the detent ball 129 to protrude from the upper platform 120. The detent ball 129 may operatively connect to a detent hole 166 of the L member 160 as described below. Alternatively, the upper platform 120 may include all or a portion of another detent. The upper platform 120 may also include a position-sensor mount in the form of a through hole 130, slot, or other suitable mount accommodating a light-based, ultrasonic, or other sensor 150 for monitoring a pivoting position of the frame 80 and the television or other visual display screen 12 by monitoring a pivoting position of the upper L member 160 (or other visual-display-screen support member), as described further below. The sensor 150 may be configured to detect an angular position of the visual-display-screen support (L member 160) and may detect whether a pivoting position of the visual-display-screen support member in the form of the L member 160 is the home position. The sensor 150 may be operatively connected to the drive mechanism 46 by way of a controller 170 such that operation of the drive mechanism depends upon the angular position of the visual-display-screen support member—for example, so that the motor 50 only drives the drive mechanism 46 to raise and/or lower the visual-display-screen support member/L member 160 when the visual-display-screen support member/L member 160 is in the home position. The visual-display-screen support member, such as the L member 160, may have a home position wherein the L member 160 is aligned with the opening 32 in the cabinet 30 to provide sufficient clearance to allow the L member 160 (including the frame 80) to be lowered and/or raised through the opening 32 without contacting the cabinet 30.

The roller bearing 100 may include a thrust bearing including an upper end plate 102 with mounting holes 104 for engaging screws 105, together providing a means for mounting the upper L member 160, the frame 80, and the television or other visual display screen 12 on the roller bearing 100 for pivoting movement with respect to the second tubular body 60. The roller bearing 100 may be secured by upper and lower thrust collars 101, 103 (FIG. 6) secured by a screw 107 engaging the upper thrust collar 101 and the lower thrust collar 103. The upper L member 160 (FIGS. 6 and 7) may have an upper cap 162 supported on and mounted for pivoting movement by the roller bearing 100. The upper L member 160 may have a rectangular cross section greater in at least one dimension than an aligned cross-sectional dimension of the second tubular body 60 so that the upper L member 160 pivots on the roller bearing 100 about the second tubular body 60 without interference from the second tubular body 60. Alternatively, the upper L member 160 may have another convenient cross-section that is either sufficiently greater than a corresponding dimension of the second tubular body 60, or is compatible in shape with the second tubular body 60, such that the visual-display-screen support member pivots on the roller bearing 100 about the upper support member or the second tubular body 60 thereof without interference from the second tubular body 60 or other components.

A detent hole 166, which may be a through hole or a depression, may be disposed on the visual-display-screen support member such as the L member 160 for engaging a portion of the detent ball 129 upon the visual-display-screen support member/L member 160 being in the home position. The upper cap 162 may have mounting holes 164 accommodating the screws 105 for securing the upper L member 160 or other visual-display-screen support member to the mounting holes 104 on the roller bearing 100 and at least one detent hole 166 for receiving the detent ball 129 or other detent to provide the user a tactile indication of when the upper L member 160 or other visual-display-screen support member is in the home position. The feedback is especially important in the system 10 including the cabinet 30 because the system will not lower the television or other visual display screen 12 into the cabinet unless the upper L member 160 is pivotably positioned in the home position. The detent may provide tactile feedback to a user to indicate that the upper L member 160 is in the home position and may also provide a degree of resistance to moving the upper L member 160 from the home position, thus avoiding inadvertent or unwanted movement of the L member 160 from the home position.

The upper cap 162 also may have a sensor hole 168. The sensor hole 168 may be a depression or through hole, disposed in operative relation with and cooperating with the sensor 150 to generate a sensor reading (for example, when the sensor detects the presence of the sensor hole 168) indicating that the upper L member 160 is in the home position. The sensor 150 may be connected via a control wire 152 to a controller 170 (FIGS. 3 and 4). The sensor 150 alternatively may connect to the controller 170 wirelessly. The controller 170 may be an electrical or electronic controller governing the operation of the motor 50. When the user attempts to activate the motor 50 by a wired or wirelessly connected or wired or wireless remote lift control 180, the controller 170, using input from the sensor 150, may determine whether the visual-display-screen support member (here the upper L member 160) is in the home position and may prevent or otherwise limit the lift 20 from extending or retracting the second tubular body 60 with respect to the lower support member and the first tubular body 44 unless the upper L member 160 is in the home position. The controller 170 and the sensor 150 may thus cooperate to prevent the lift 20 from lowering and/or raising (particularly lowering) the second tubular body 60, the upper L member 160, and the frame 80, in order to prevent damage to the television or other visual display screen 12, the cabinet 30, or any other system components that might occur through movement of the lift 20 when the upper L member 160, other pivotably supported member, frame 80, or television or other visual display screen 12 is not in the home position.

Referring to FIGS. 8-13, in another embodiment, the visual-display-screen support differs in certain details from the above-discussed embodiment. A pivot pin 202 may be attached to a second embodiment of the upper platform 120' and may support a second embodiment of a visual-display-screen support member 160' for pivoting with respect to the upper platform 120'. The upper platform 120' may have an upper surface 122'. A bearing hole 124' may extend through the upper surface 122' and through the upper platform 120'. The bearing hole 124' may include one or more stepped portions 125 (two are shown), each adapted to accept a bearing 100'. Mounting holes 126 may be provided to allow for fastening the upper platform 120' to the upper end portion 62 of the second tubular body 60 of the upper support member. A second embodiment of the upper L member 160' may be substantially similar to the upper L member 160, with differences discussed below.

Figure 9:
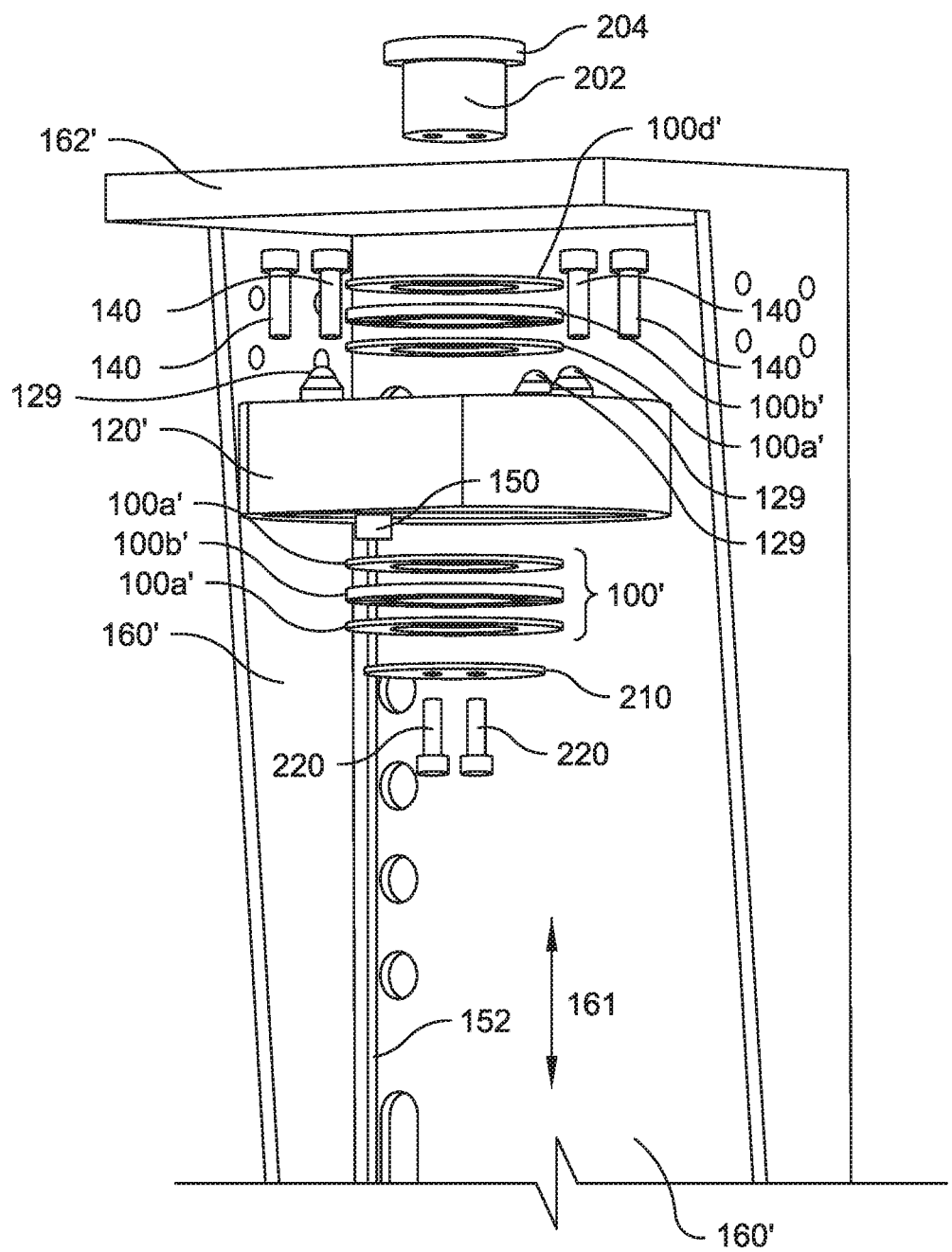
FIG. 9 is a front right exploded partial perspective view of a portion of the second embodiment of the visual-display-screen lift according to the present disclosure.
Figure 10:
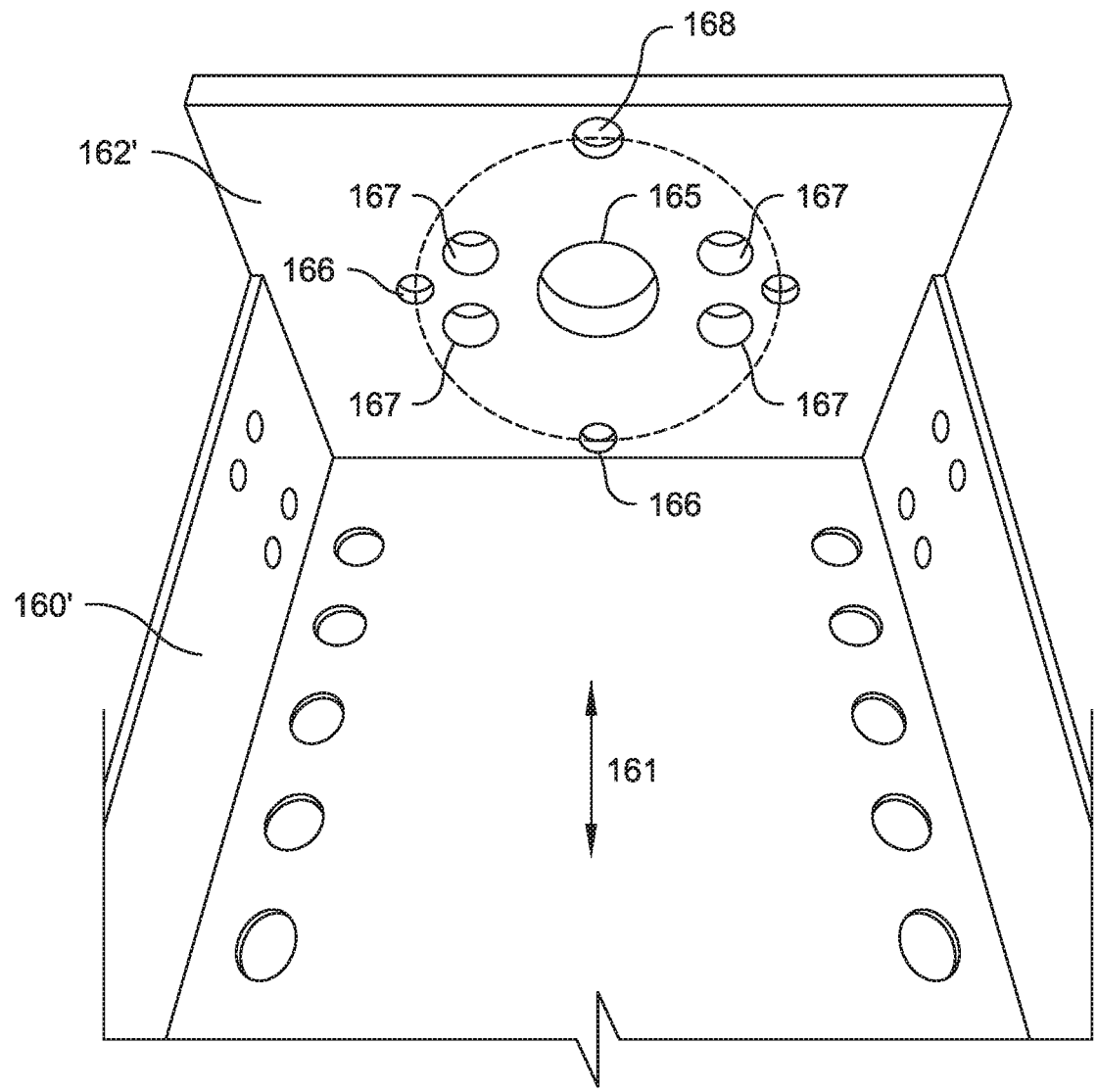
FIG. 10 is an internal partial perspective view of an upper L member according to the second embodiment of the visual-display-screen lift according to the present disclosure.
Figure 11:
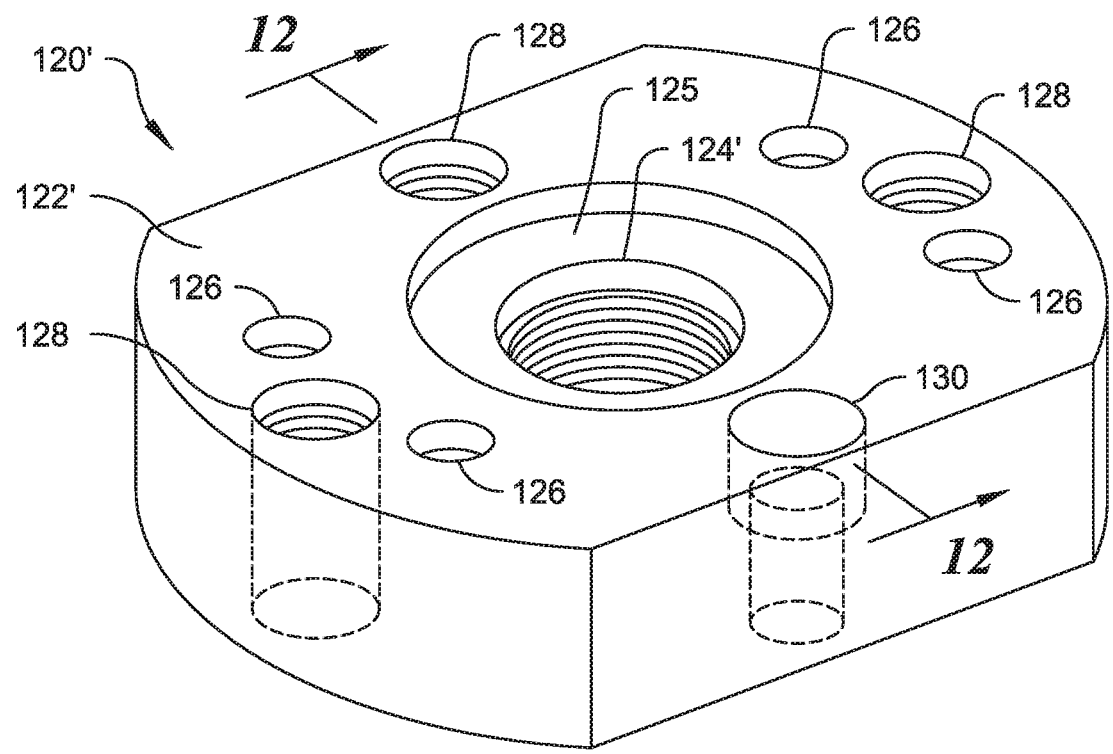
FIG. 11 is an enlarged front left upper partial perspective view of a portion of the second embodiment of the visual-display-screen lift according to the present disclosure.
Figure 12:
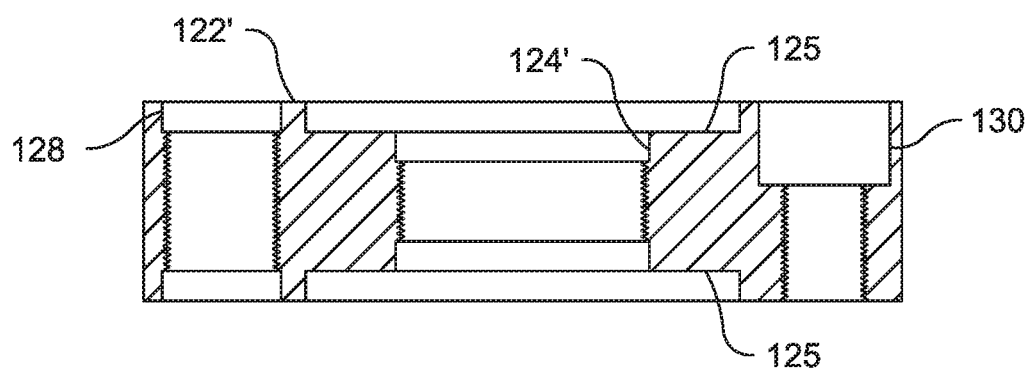
FIG. 12 is a cross section shown along line 12-12 of FIG. 11.
Figure 13:
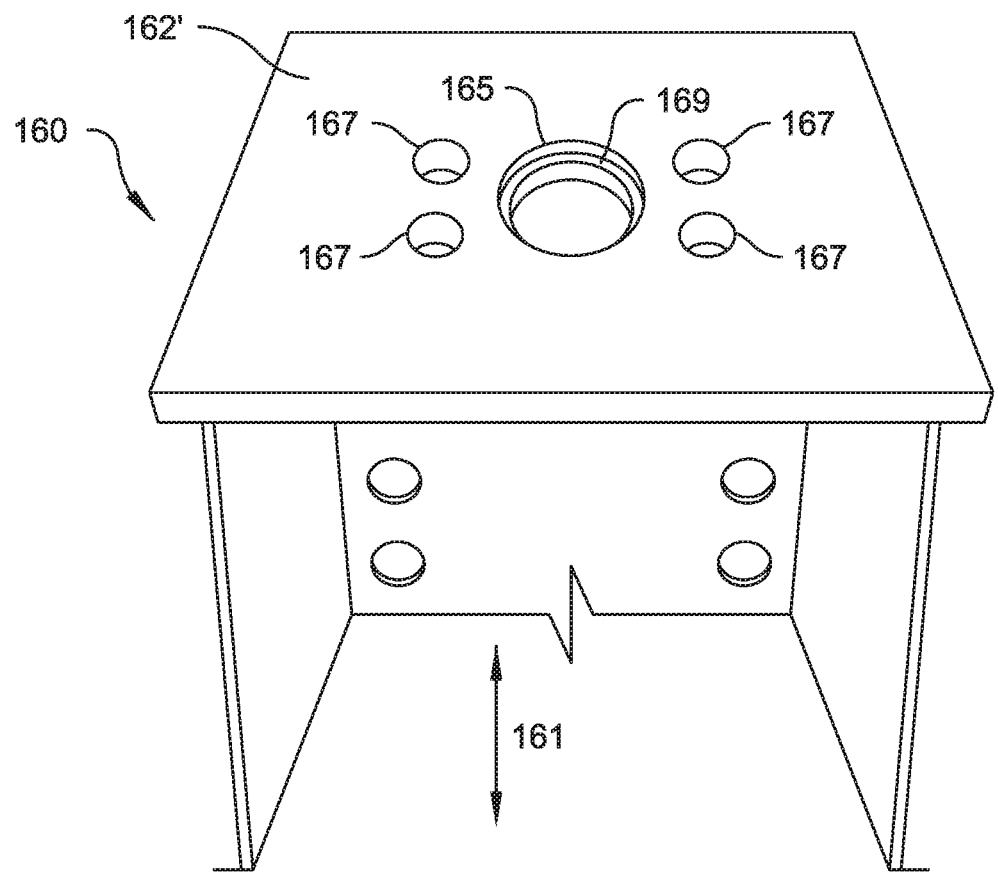
FIG. 13 is an upper partial perspective view of the upper L member of FIGS. 11-12.

Each bearing 100' (two are shown) may rotatably support the visual-display-screen support member/upper L member 160' with respect to the upper platform 120'. An example of a suitable bearing 100' may include a rolling or rotating element 100b' and a pair of washers 100a' or other suitable end plates (FIG. 9). The visual-display-screen support member (here the upper L member 160') thus may be pivotable with respect to the pivot pin 202. (The upper L member 160' may in the alternative be rotationally fixed with respect to the pivot pin 202 by being fixed thereto, using a mechanical fastener, welding, or otherwise as is known in the art (not shown).) In the embodiment of FIG. 8-13, the pivot pin 202 has a shoulder 204, and the pivot pin 202 passes through a pivot-pin aperture 165 in the cap 162' of the upper L member 160' such that the shoulder 204 of the pivot pin 202 may secure the upper L member 160' to the upper platform 120'. The pivot-pin aperture 165 may include a radial shoulder 169 for engaging the shoulder 204 of the pivot pin 202. Access holes 167 in the upper cap 162' may be provided to allow for tightening and loosening of the screws 140.

Referring to FIG. 9, a pivot-pin backing body 210 may comprise a plate with one or more fasteners, holes, or slots passing therethrough. The pivot-pin backing body 210 may be round as shown or another suitable shape and may be removably fastened to the pivot pin 202 to secure the pivot pin 202 to the upper platform 120', as shown in FIG. 9. A threaded fastener such as a screw 220 (two are shown in FIG. 9) may engage and attach to one another the pivot pin 202 and the pivot-pin backing body 210.

Referring again to FIGS. 8-13, the upper platform 120' also may have mounting holes 126 for securing the platform 120' to the second tubular body 60, and in particular to the upper end portion 62, by fasteners such as screws 140. The upper platform 120' may include portions of one or more detents (three are shown), each operating as described above. Each detent may include, for example, a ball-detent mount 128 (three are shown). Each ball-detent mount 128 may be a depression or hole holding a detent ball 129 disposed within the upper platform 120' and driven to protrude therefrom by a spring 132. The upper cap 162' may have three detent holes 166 for cooperating with the three detent balls 129 of the upper platform 120'. As with the upper platform 120, the upper platform 120' may have a sensor 150, and the sensor 150 may be connected via a control wire 152 to a controller 170 (FIGS. 3 and 4). The sensor 150 and controller 170 may provide the same functionality in any embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

We claim:

1. A visual-display screen lift comprising:
   a base;
   a lower support member attached to the base;
   an upper support member having an upper end portion and a lower portion telescopically engaged with the lower support member;
   a visual-display-screen support member pivotably connected to the upper end portion of the upper support member for pivotably supporting a visual display screen thereon, the visual-display-screen support member having a home position aligning the visual-display-screen support member at a selected angular orientation with respect to the upper support member;
   a drive mechanism operatively connected to the upper support member for raising and lowering the upper support member;
   a sensor configured to detect an angular position of the visual-display-screen support member, the sensor being operatively connected to the drive mechanism by a controller such that operation of the drive mechanism depends upon the angular position of the visual-display-screen support member;
   a detent operatively connected to the upper support member and the visual-display-screen support member, the detent resisting movement of the visual-display-screen support member from the home position when the visual-display-screen support member is in the home position; and
   an upper platform fixed upon the upper end portion of the upper support member, and wherein the visual-display-screen support member is supported by a bearing operatively connected to the upper platform, and the detent comprises a detent ball disposed within the upper platform, a spring disposed within the upper platform to drive the detent ball outwardly with respect to the upper platform, and a detent hole disposed on the visual-display-screen support member for engaging a portion of the detent ball upon the visual-display-screen support member being in the home position.

2. The visual-display-screen lift according to claim 1, further comprising a transverse support member configured for mounting a visual display screen thereto and fixed to the visual-display-screen support member.

3. The visual-display-screen lift according to claim 1, further comprising a cabinet having an interior containing the base, the lower support member, and a portion of the upper support member when the upper support member is in a lowered position, the cabinet having an opening for passing therethrough the portion of the upper support member and the visual-display-screen support member when the upper support member is moved to a raised position, wherein the home position is aligned with the opening of the cabinet.

4. The visual-display-screen lift according to claim 1, wherein the lower support member comprises a first tubular body, and the upper support member comprises a second tubular body.

5. The visual-display-screen lift according to claim 4, wherein the first tubular body is non-circular in cross-section, and the second tubular body is non-circular in cross-section.

6. The visual-display-screen lift according to claim 1, wherein the visual-display-screen support member has a longitudinal axis and a cross section transverse to the longitudinal axis, and the cross-section is generally U-shaped, and the visual-display-screen support member has an upper end with an upper cap.

7. The visual-display-screen lift according to claim 1, further comprising a pivot pin attached to the upper platform and supporting the visual-display-screen support member for pivoting with respect to the upper platform.

8. The visual-display-screen lift according to claim 7, wherein the bearing rotatably supports the visual-display-screen support member with respect to the upper platform.

9. The visual-display-screen lift according to claim 7, wherein the visual-display-screen support member is pivotable with respect to the pivot pin.

10. The visual-display-screen lift according to claim 7, wherein the pivot pin has a shoulder, and the pivot pin passes through a pivot-pin aperture in the visual-display-screen support member such that the shoulder of the pivot pin secures the visual-display-screen support member to the upper platform.

11. The visual-display-screen lift according to claim 10, further comprising:
    a pivot-pin backing body removably fastened to the pivot pin and securing the pivot pin to the upper platform.

12. The visual-display-screen lift according to claim 11, further comprising a threaded fastener engaging the pivot pin and the pivot-pin backing body.

13. The visual-display-screen lift according to claim 1, wherein the sensor is one of a light sensor and an ultrasonic sensor.

14. The visual-display-screen lift according to claim 1, wherein the drive mechanism is a drive motor, the visual-display-screen lift further comprising:
    a threaded rod operatively connected to the drive motor to be driven rotationally thereby, the threaded rod being axially fixed with respect to the lower support member;
    a drive block secured within the lower support member to be rotationally fixed but axially movable with respect to the lower support member, the drive block being threadedly engaged with the threaded rod so that when the threaded rod rotates, the drive block translates axially with respect to the lower support member, and the drive block being operatively connected to the upper support member so that when the drive block translates axially with respect to the lower support member, the upper support member translates axially with respect to the lower support member.

15. The visual-display-screen lift according to claim 14, further comprising a drive mechanism pipe fixed to the drive block to translate axially with the drive block, the drive mechanism pipe being operatively engaged with the upper support member so that when the drive mechanism pipe translates axially, the upper support member translates axially with respect to the lower support member.

16. The visual-display-screen lift according to claim 15, wherein the drive block is threadedly engaged with the threaded rod by the threaded rod being threadedly engaged with the drive mechanism pipe, with the drive mechanism pipe being fixed to the drive block.

17. The visual-display-screen lift according to claim 1, wherein the controller is configured so that the drive mechanism raises the visual-display-screen support member only when the visual-display-screen support member is in the home position.

18. The visual-display-screen lift according to claim 1, wherein the controller is configured so that the drive mechanism lowers the visual-display-screen support member only when the visual-display-screen support member is in the home position.

19. A visual-display screen lift comprising:
 a base;
 a lower support member attached to the base;
 an upper support member having an upper end portion and a lower portion telescopically engaged with the lower support member;
 a visual-display-screen support member pivotably connected to the upper end portion of the upper support member for pivotably supporting a visual display screen thereon, the visual-display-screen support member having a home position aligning the visual-display-screen support member at a selected angular orientation with respect to the upper support member;
 a drive mechanism operatively connected to the upper support member for raising and lowering the upper support member;
 a sensor configured to detect an angular position of the visual-display-screen support member, the sensor being operatively connected to the drive mechanism by a controller such that operation of the drive mechanism depends upon the angular position of the visual-display-screen support member; and
 a detent operatively connected to the upper support member and the visual-display-screen support member, the detent resisting movement of the visual-display-screen support member from the home position when the visual-display-screen support member is in the home position,
 wherein the visual-display-screen support member has a longitudinal axis and a cross section transverse to the longitudinal axis, and the cross-section is generally U-shaped, and the visual-display-screen support member has an upper end with an upper cap;
 wherein the sensor is one of a light sensor and an ultrasonic sensor, and the upper cap has an aperture or a depression in operative relation with the sensor when the visual-display-screen support member is in the home position.

20. The visual-display-screen lift according to claim 19, wherein the drive mechanism is a drive motor, the visual-display-screen lift further comprising:
 a threaded rod operatively connected to the drive motor to be driven rotationally thereby, the threaded rod being axially fixed with respect to the lower support member;
 a drive block secured within the lower support member to be rotationally fixed but axially movable with respect to the lower support member, the drive block being threadedly engaged with the threaded rod so that when the threaded rod rotates, the drive block translates axially with respect to the lower support member, and the drive block being operatively connected to the upper support member so that when the drive block translates axially with respect to the lower support member, the upper support member translates axially with respect to the lower support member.

* * * * *